United States Patent [19]
Watts

[11] 3,765,637
[45] Oct. 16, 1973

[54] QUICK DISCONNECT SEAT TRACK CARGO TIE DOWN

[75] Inventor: Max W. Watts, Tiger, Ga.

[73] Assignee: Aid Corporation, Clayton, Ga.

[22] Filed: Apr. 16, 1971

[21] Appl. No.: 134,706

[52] U.S. Cl............................................. 248/361 A
[51] Int. Cl............................................. B65j 1/22
[58] Field of Search................... 248/361 R, 220.5, 105/369 A; 85/38; 287/20.5, 20.5 SL; 292/302; 24/224 B, 224 SL, 211 R

[56] References Cited
UNITED STATES PATENTS

| | | | |
|---|---|---|---|
| 3,106,377 | 10/1963 | Cotton | 248/361 R |
| 3,212,457 | 10/1965 | Looker | 248/361 A |
| 3,605,637 | 9/1971 | Prete | 248/361 A |
| 2,891,490 | 6/1959 | Elsner | 105/369 A |
| 1,259,397 | 3/1918 | Hathaway | 248/361 X |

*Primary Examiner*—Edward C. Allen
*Attorney*—Newton, Hopkins & Ormsby

[57] ABSTRACT

A quick connectable and disconnectable cargo tie-down apparatus including one attachment member having a socket means with a number of entrance openings and another attachment means having a number of alignment projections with laterally movable latching means. The socket means of the one attachment member includes an elongated, recessed socket having laterally extending projections extending into the sockets for defining the number of entrance openings and providing a number of fixed lateral latching surfaces. The projections of the other attachment member are complementary in radial dimensions to the entrance openings of the socket with the latching means having a number of movable lateral latching surfaces for latching engagement with the fixed latching surfaces. The latching means is reciprocally operable between a projection aligned connecting and disconnecting position and a displaced latch retaining position with spring biasing means for normally urging the latching means to the displaced latch retaining position. The attachment member having the latching means includes a rotatably and pivotally mounted clevis connecting element supported thereon with the clevis element including a formed opening for receiving tie-down means used in a cargo tie-down operation.

6 Claims, 8 Drawing Figures

PATENTED OCT 16 1973  3,765,637

INVENTOR.
MAX W. WATTS

BY: Newton, Hopkins, & Ormsby
ATTORNEYS

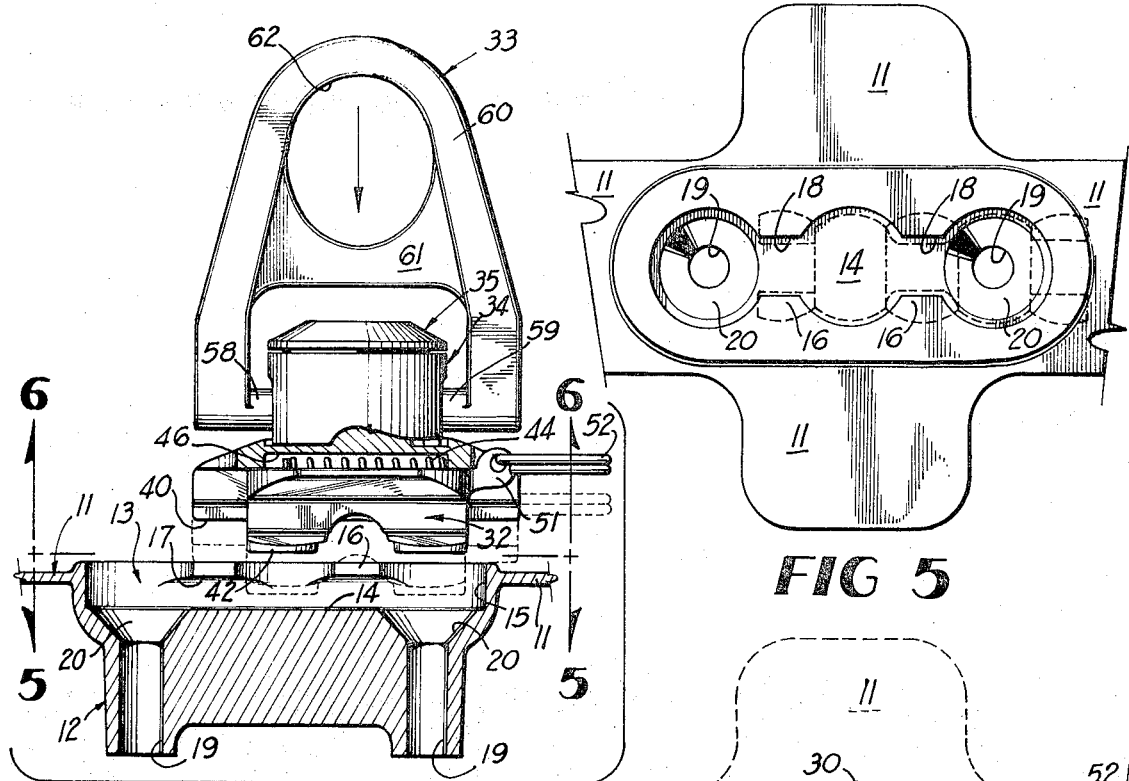
FIG 4
FIG 5
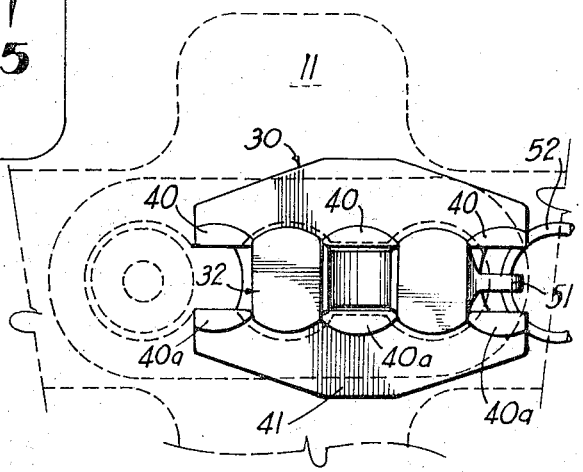
FIG 6
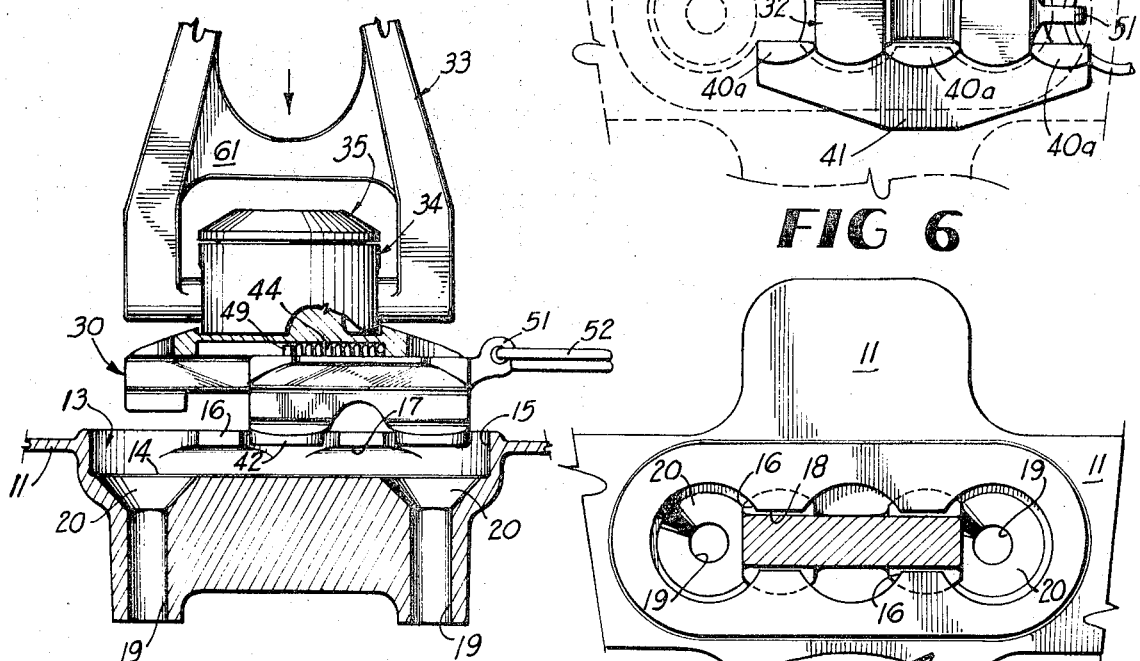
FIG 7
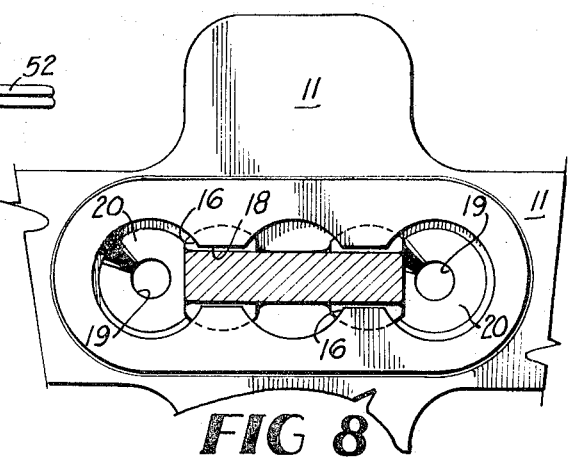
FIG 8

QUICK DISCONNECT SEAT TRACK CARGO TIE DOWN

BACKGROUND OF THE INVENTION

This invention relates to a hold-down device operable for securing cargo in a fixed position within an aircraft during transport. More particularly, this invention includes a quickly connectable and disconnectable latching means operable for securing a hold-down device in a fixed position in the seat track of a cargo tie-down mechanism of an aircraft.

Due to the fast delivery of air cargo, the aircraft industry is used more and more in the shipment of goods between various locations. In the shipment of cargo by aircraft, it is necessary to securely lock the cargo in a fixed position relative to the aircraft during transport in order to render the aircraft safely operable during the flight.

Further, cargo tie-down means must be both light in weight and sufficiently strong to insure that the cargo transported will be securely held in a fixed position.

A number of attempts have been made to provide quick connectable and disconnectable hold-down devices for use in aircraft in the shipment of cargo. However, the prior art cargo hold-down devices were extremely complex in construction, uneconomical to manufacture and time consuming in utilization. Connection and disconnection of the prior art hold-down devices required the use of both hands of an operator, usually requiring one hand to hold the device and the other hand to rotate the latch mechanism. Also, the prior art hold-down devices did not provide a maximum strength per weight ratio due to the complex latch mechanism used.

In order to take full advantage of fast delivery time of aircraft cargo shipments, effective hold-down means must be provided which are quickly connectable in a hold-down position and quickly disconnectable therefrom.

SUMMARY OF THE INVENTION

The above disadvantages of the prior art cargo hold-down devices have been overcome by the present invention which basically includes an attachment member having a number of projection elements and including a slidably mounted latching means supported thereon with the latching means being reciprocally operable between a first position aligned with the projection elements and a second position with the latching means displaced relative to the projection elements. Spring biasing means is operatively associated with the latching means for normally urging the latching means to the second displaced latching position.

An important feature of the present invention is that the projection elements on the attachment member are readily receivable and operable with conventional seat track means used in an aircraft. A manual control element is operatively associated with the latching means for moving the latching means against the spring biasing means to the aligned connecting and disconnecting position.

An additional feature of the present invention is the reciprocally operable latching means which can be moved between the aligned connecting position with a bodily displacement of the attachment member.

The attachment member includes a clevis element having a tie-down receiving opening formed therein and including means rotatably supporting the clevis member on the attachment member for rotation about a first axis and means for supporting the clevis member on the attachment member for pivotal movement about a second axis.

Additional features of the present invention involve the details of construction of the attachment member and the reciprocally operable latch means whereby a maximum effective strength is provided in the attachment member and latching means for securely holding the attachment member in a fixed position relative to a seat track holding means.

It is therefore, a primary object of the present invention to provide a quick connectable and disconnectable cargo hold-down device effectively operable to provide the desired strength characteristics.

Another object of the present invention is to provide apparatus operable for permitting a quick connection and disconnection between a pair of attachment members.

A further object of this invention is to provide a quick connectable and disconnectable attachment member which is readily receivable and operable for latching the attachment member to a conventional seat truck holding device.

A still further object of this invention is to provide an attachment member which can be secured in a holding position without the use of any connecting tool means.

Still another object of this invention is to provide a reciprocally operable latch means for securing an attachment member in a latched position.

Yet another object of this invention is to provide a hold-down device having latching means automatically movable to a latching position in response to a bodily displacement of the hold-down device to an operative position.

Another object of this invention is to provide a quick disconnect hold-down device having a universally movable, hook engagable member.

An additional object of this invention is to provide a quick disconnect hold-down device simple in construction and operation, economical to manufacture and reliable in performance.

These and other objects and advantages of the details of construction will become apparent upon reading the following description of the illustrative embodiment of the invention with reference to the attached drawings wherein like reference numerals have been used to refer to like parts throughout the several figures, and wherein:

BRIEF DESCRIPTION OF THE DRAWINGS

FIG. 4 is a vertical sectional view similar to FIG. 3 showing certain of the mechanism moved to a disconnected position;

FIG. 5 is a top plan view taken substantially along lines 5—5 of FIG. 4;

FIG. 6 is a plan view similar to FIG. 5 taken along lines 6—6 of FIG. 4;

FIG. 7 is a fragmetnary vertical sectional view similar to FIG. 4 showing certain of the attachment mechanism moved to a first position of connection; and FIG. 8 is a horizontal sectional view taken along lines 8—8 of FIG. 2.

DESCRIPTION OF THE ILLUSTRATIVE EMBODIMENT

Figure 1:
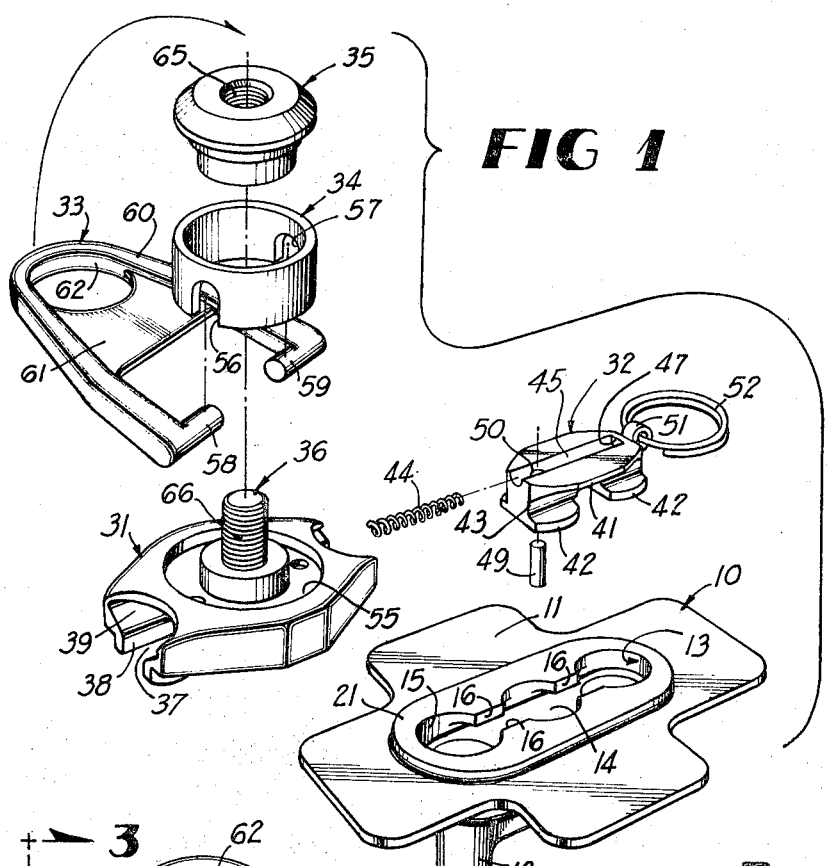
FIG. 1 is an exploded perspective view of a quick disconnect hold-down device embodying the principles of the present invention.

Referring now to the drawing, the present invention will be described with reference to a first attachment member represented generally by the numeral 10 and a second attachment member represented generally by the numeral 30. The function of the first attachment member 10 is to serve as a seat track which is adapted to be anchored to the base structure of an aircraft or other vehicular supporting means to provide an anchor and means for readily receiving the connectable elements of the second attachment member 30.

The function of the second attachment member 30 is to provide a quick connectable and disconnectable means which can be readily inserted to and latched into position relative to the first attachment member and including additional means whereby cargo strap means can be readily connected thereto by conventional releasable hook elements.

Figure 3:
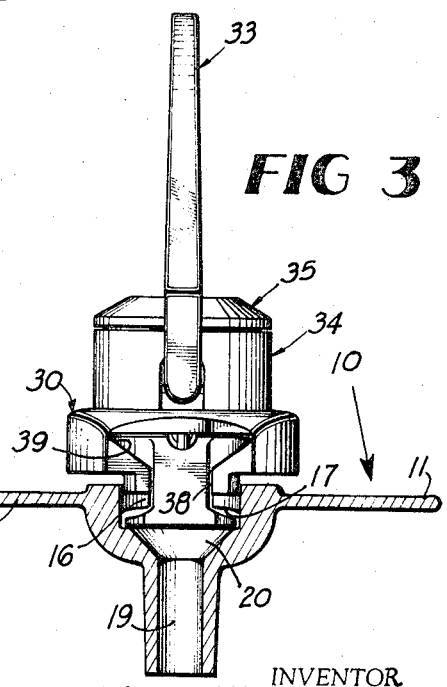
FIG. 3 is a vertical sectional view taken substantially along lines 3—3 of FIG. 2.

The first attachment member 10 includes an upper surface portion 11 and a downwardly depending body portion 12. Formed in attachment member 10 is an upwardly opened elongated socket 13. Socket 13 includes a substantially horizontal base portion 14 having vertically oriented wall means 15 extending around the lateral edge thereof. A number of lateral tabs 16 are formed on the upper peripheral edge of socket wall portion 15. Lateral tabs 16 are detailed in shape and location to provide three horizontally spaced, substantially circular shaped entrance openings through which connectable means can be inserted into the sockets 13. The lateral tabs 16 are spaced vertically above base 14 and define a downwardly directing latching surface 17, as shown in FIGS. 3, 4 and 7. The lateral tabs 16 terminate in spaced relationship relative to each other to define sliding guide track means there-between as indicated by reference numeral 18 in FIG. 5.

Figure 2:
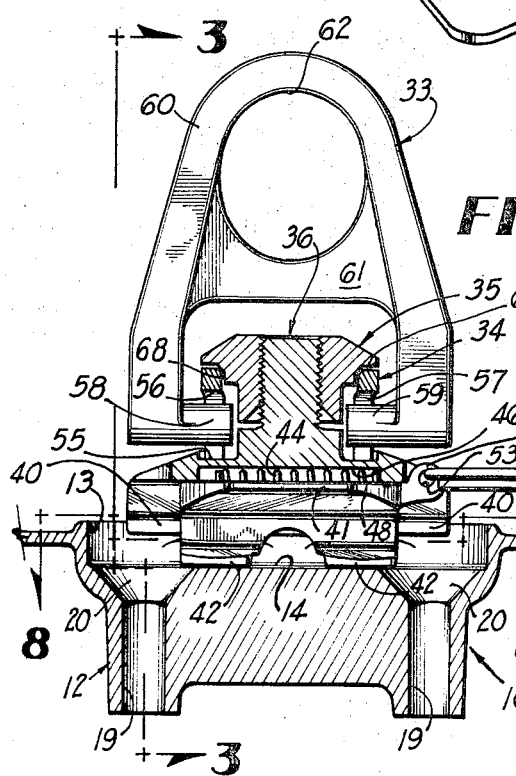
FIG. 2 is a vertical sectional view taken substantially longitudinally through the hold-down device of FIG. 1 when in an assembled position.

As shown in FIGS. 2–4, and 7, the first attachment member 10 is provided with a pair of spaced openings 19 formed within body 12. Openings 19 are vertically oriented relative to top 11 and are detailed in location to be substantially coaxially aligned relative to the two outer entrance openings formed in socket 13. Openings 19 are provided for receiving connectable means, such as an anchor screw, which can be inserted therein for securing the attachment member 10 in a fixed position relative to a supporting surface. As shown in FIGS. 2 and 3, the upper portion of openings 19 are provided with countersunk means 20 whereby a complementary headed screw element can be inserted and connected therein such that the upper surface of the screw will be substantially coplaner or slightly recessed below the socket base portion 14. The countersunk portion 20 of openings 19 will ensure that a connecting screw element is detailed in position relative to socket base portion 14 to permit free sliding movement of latching means relative thereto. The top portion 11 of attachment element 10 is provided with a slightly raised surface portion 21 which is provided around the peripheral edge of socket 13.

As shown on the drawings, the quick disconnect tiedown apparatus includes a second attachment member 30. The second attachment member 30 includes a supporting body 31 having a reciprocally operable latching insert member 32 supported on a bottom side thereof and including a clevis shaped retaining ring 33 mounted on an upper portion thereof. The clevis shaped retaining ring means 33 is supported on an upper portion of body 30 by means of a swivel ring 34 and a retaining cap 35. Clevis means 33 is supported for rotary movement about a mounting stud 36 by means of the swivel ring 34 and is pivotally movable about a substantially horizontal axis perpendicular to and extending through the axis of the mounting stud 36.

As shown in FIGS. 1–3, the attachment body 31 includes an elongated substantially T-shaped slot extending therethrough for providing a guide track means for latching insert 32. The T-shaped slot 37 is provided with an outwardly directed opening 38 extending along the length thereof. Slot opening 38 extends from a slot base portion 39. Slot opening 38 and slot base portion 39 extend throughout the length of body 31. The slot base portion 39 is formed substantially at right angles relative to slot opening 38, with the slot base portion being substantially parallel oriented relative to the bottom surface of body 31. As shown in FIG. 6, a number of downwardly extending projection elements 40 are provided along one lateral side edge of slot opening 38. An additional number of downwardly extending projections 40a are provided along an opposite lateral side edge of opening 38. The projections 40, 40a are laterally aligned relative to each other with the projections 40, 40a including arcuate lateral surface portions coaxially formed relative to each other. The shape and dimensions of projections 40, 40a are detailed such that they can be readily received or inserted within the entrance opening provided in the receiving socket 13 of attachment member 10.

In an assembled position, the latching insert 32 is reciprocally slidable within the T-shaped slot 37. Latching insert 32 is shaped similar to an I-beam, in cross section, as shown in FIG. 3. Latching insert 32 includes a laterally projecting top surface 41, a pair of oppositely and laterally projecting latching surfaces 42, with lateral surfaces 41 and 42 being integrally connected by means of a body member 43. The dimensions and shape of the top lateral surface 41 is detailed to be complementary to and slidably movable within the T-shaped slot base portion 39. Connecting body portion 43 is detailed in shape to be slidably movable within the slot opening 38. Lateral latching surfaces 42 are detailed in spacing and of radial dimensions to be complementary to and readily receivable within the entrance openings provided in receiving socket 13. The arcuate outer surfaces of lateral latching surfaces 42 are formed about a radius which is substantially equal to the radius of the arcuate outer surfaces of projections 40, 40a described hereinabove.

In an assembled position, as shown in FIGS. 2–8, the latching insert 32 is reciprocally slidable within the T-shaped slot 37 of body 30. Latching insert 32 is movable between the first position with the laterally extending latching surfaces 42 coaxially aligned relative to projections 40, 40a, and a displaced position with the latching surfaces 42 located between the space provided between adjacent projections 40 and adjacent projections 40a. With the latching surfaces 42 coaxially aligned with projections 40, 40a the body member 30 can be readily inserted within receiving socket 13. In a displaced position, the latching surfaces 42 are movable to a position underneath and aligned with lateral tabs 16 formed on the upper peripheral edge of socket 13. The dimensions of latching insert body 43 are detailed such that the body 43 is complementary to and slidable within the elongated track means 18 formed by tabs 16.

Latching insert 32 is spring biased to a displaced latching position by means of a compression spring 44. Compression spring 44 is supported in elongated recesses 45, 46 provided on an upper surface of latching insert 32 and a bottom surface of body member 31, respectively. In an assembled position, compression spring 44 is trapped between axial blocking surfaces 47, 48 formed on recesses 45, 46, respectively, adjacent one end and by means of a pin 49 which is inserted through an opening 50 formed within body 43 of latching insert 32. As shown in FIG. 2, the latching insert 32 is spring biased by compression spring 44 leftward to the displaced position. A leftward displaced limit position is controlled by means of an upstanding tab portion 51 which is provided on a right edge of latching insert 32, as shown in FIGS. 1 and 2. Movement of latching insert from the spring biased displaced latching position to the aligned disconnecting and connecting position is effected by means of a ring member 52. Ring member 52 is inserted through an opening 55 formed in tab 51. The circular recess 55 is provided for rotatably supporting swivel ring 34. Swivel ring 34 is detailed in dimensions to be rotatably received within recess 55. Swivel ring 34 is provided with a pair of downwardly directed substantially U-shaped notches 56, 57. Notches 56, 57 are diametrically aligned with each other on swivel ring 34. U-shaped notches 56, 57 are shaped to extend around pivot studs 58, 59, respectively, provided on the clevis ring means 33. Clevis ring means 33 includes a substantially U-shaped outer ring portion 60 with the pivot studs 58, 59 formed integrally with and at substantially right angles with the extended leg portions of U-shaped ring 60. Pivot studs 58, 59 are coaxially aligned relative to each other whereby they can be readily received within diametrically aligned notches 56, 57. The notches 56, 57 are detailed in location on swivel ring 34 to provide a pivot axis for clevis ring means 33 which extends through the rotary axis of swivel ring 34. Rotary movement of swivel ring 34 and pivotal movement of stud members 58, 59 relative to notches 56, 57 will permit the clevis ring means 33 to be both rotatable about a substantially vertical axis and pivotally movable about a substantially horizontal axis with the horizontal axis extending through the vertical axis.

The legs of U-shaped ring 60 are provided with a connecting plate means 61 located therebetween and detailed in shape to define a connecting ring 62 formed between the base of U-shaped ring 60 and one surface portion of connecting plate 61.

As shown in FIG. 2, the clevis ring means 33 and swivel ring means 34 are supported in an assembled position relative to attachment body 31 by means of a cap 35. Cap 35 is provided with a threaded opening 65 which is adapted to be threadably received on complementary thread means 66 provided on mounting stud 36. Cap 35 is provided with a radial flange 67 detailed in dimensions to extend outwardly over the upper edge of swivel ring 34. Also formed on cap 35 is an axially aligned bearing surface 68 which intersects the bottom surface of radial flange 67 to provide a rotary guide track for the upper surface of swivel ring 34. In an assembled position as shown in FIG. 2, cap 35 is threadably received on mounting stud 36 such that the swivel ring 34 is trapped between and secured within circular recess 55 and radial flange 67 of the attachment body 30 and cap 35, respectively. In assembling cap 35 on mounting stud 36, cap 35 is rotated to an adjusted position which will permit rotary movement of the swivel ring 34 between circular recess 55 and radial flange 67.

The above described attachment members 10, 30, latching insert 32, clevis ring means 33, swivel ring 34, and cap 35 are constructed of conventional metal stock material such as aluminum or magnesium which will provide the desired strength and lightweight characteristics needed in an aircraft cargo tie-down means. However, in certain applications, the tie-down apparatus of the present invention could be constructed of conventional synthetic material which would meet the desired strength characteristics needed in the particular application thereof.

OPERATION

The base attachment member 10 is secured in position adjacent the base cargo surface of an aircraft by inserting conventional connecting screw means through opening means 19 and adjusting the screw means to a set position with head portions thereof received within the countersunk head means 20.

The quick disconnect tie-down apparatus including attachment member 30 is assembled by locating compression spring 44 within the recess 46 on the underside of attachment body 30. With compression spring 44 in recess 46, the latching insert 32 is slidably mounted within T-shaped slot 37 with lateral projection 41 inserted within slot base portion 39 and with the recess 45 aligned with the compression spring 44 supported in recess 46.

After the latching insert 32 has been moved to an extreme leftward position with limit tab 51 contacting a right edge of body 31, the spring 44 is then compressed sufficiently to allow pin 49 to be inserted through opening 50. With pin 49 inserted to a limit position, spring 44 will be trapped between pin 49 and blocking surface 47, 48 formed on recesses 45, 46 to maintain the latching insert 32 in a spring biased relationship, as shown in FIG. 2, with limit tab 51 contacting the right portion of body 30.

After the latching insert 32 has been properly assembled as described hereinabove, the clevis ring means 33 is secured to an upper surface of attachment body 31 by placing the swivel ring notches 56, 57 over pivot studs 58, 59, and positioning the swivel ring within circular recess 55. With the swivel ring 34 holding the clevis ring means 33 in position relative to circular recess 55, cap means 35 is then threaded onto stud 36. Cap 35 is adjusted relative to stud 36 whereby the swivel ring will be trapped between radial projection 67 and circular recess 55 and will be freely rotatable relative thereto.

After the first attachment member 10 has been secured in position and the second attachment member 30 has been properly assembled, as described hereinabove, the second attachment member 30 can be easily attached to the first attachment member 10 by positioning the body 31 of attachment member 30 above the receiving socket 13, of first attachment member 10, and with lateral latching surfaces 42 aligned with and inserted within entrance openings provided in receiving socket 13. After the lateral latching surfaces 42 have been inserted within entrance openings of the receiving socket 13, a quick connection is made relative of the first attachment member 10 and second attachment member 30 by bodily moving attachment member 30 to the left, as shown in FIG. 7.

After the attachment body member 30 has been moved to the left a sufficient distance to align projection 40, 40a, with the entrance opening of receiving socket 13, the latching surfaces 42 and projection 40, 40a, will drop in place within the receiving socket 13 and compression spring 44 will spring bias latching surfaces 42 to the left beneath latching tabs 16 formed on receiving socket 13. With the latching surfaces 42 positioned beneath latching tabs 16, the attachment member 30 is securely latched in position relative to attachment body member 10.

With the attachment body member 30 securely latched to attachment body member 10, cargo can be secured in a set position relative to an aircraft supporting base means by inserting either a conventional strap means through opening 62 of clevis ring means 33 or by connecting conventional hook means therein.

When it is desired to remove the attachment body member 30 from the attachment body member 10, a quick disconnection is made by grasping the control ring 52 and pulling latching insert to the right, as shown in FIG. 7, until the latching surface 42 moves into a coaxially aligned position relative to the entrance openings of socket 13. After latching surfaces 42 are moved to a rightward coaxially aligned position with the entrance openings of the receiving socket 13, the attachment body member 30 is quickly displaced from attachment member 10 due to the pulling forces applied to control ring 52.

It now becomes apparent that the above described illustrative embodiment, embodying the principles of the present invention, is capable of obtaining the above stated objects and advantages. It is obvious that those skilled in the art could make modifications in the details of construction without departing from the spirit of the invention which is to be limited only by the scope of the appended claims.

I claim:

1. A connectable element adapted to be quickly connected to and disconnected from a seat track cargo tiedown comprising, in combination:
   a. a connectable member, said connectable member including means defining a number of spaced projections;
   b. a latching member, said latching member including means defining a pair of spaced projections;
   c. means slidably supporting said latching member on said connectable member whereby said latching member can be moved between a connecting and disconnecting position, in which said latching projections are aligned with said connectable member projections, and a latching position in which said latching projections are displaced relative to said connecting member projections;
   d. means biasing said latching member to said displaced latching position;
   e. control means connected to said latching member whereby said latching member can be moved to said aligned connecting sand disconnecting position; and
   f. said connectable member including an elongated track means formed therein in transversely aligned relationship relative to said spaced projections and said latching member being slidably supported within said elongated track means and reciprocally operable between said aligned connecting and disconnecting position and said displaced latching position.

2. A connectable element adapted to be quickly connected to and disconnected from a seat track cargo tiedown comprising, in combination:
   a. a connectable member, said connectable member including means defining a number of spaced projections;
   b. a latching member, said latching member including means defining a pair of spaced projections;
   c. means slidably supporting said latching member on said connectable member whereby said latching member can be moved between a connecting and disconnecting position, in which said latching projections are aligned with said connectable member projections, and a latching position in which said latching projections are displaced relative to said connecting member projections;
   d. means biasing said latching member to said displaced latching position;
   e. control means connected to said latching member whereby said latching member can be moved to said aligned connecting and disconnecting position; and
   f. said spaced projections on said latching member including means defining laterally projecting latching surfaces formed thereon.

3. A connectable element as in claim 2 wherein said means for biasing said latching member to displaced latching position is a spring.

4. Apparatus as in claim 3 wherein said spring is received in adjacent elongated recesses in said connectable member and latching member.

5. Apparatus as in claim 2 wherein said central means comprises a tab on said latching member formed with a loop, and a ring inserted through said loop.

6. A connectable element adapted to be quickly connected to and disconnected from a seat track cargo tiedown comprising, in combination:
   a. a connectable member, said connectable member including means defining a number of spaced projections;
   b. a latching member, said latching member including means defining a pair of spaced projections;
   c. means slidably supporting said latching member on said connectable member whereby said latching member can be moved between a connecting and disconnecting position, in which said latching projections are aligned with said connectable member projections, and a latching position in which said latching projections are displaced relative to said connecting member projections;
   d. means biasing said latching member to said displaced latching position;
   e. control means connected to said latching member whereby said latching member can be moved to said aligned connecting and disconnecting position; and f. said connectable member including clevis means having formed hook engaging means, and also including means supporting said clevis means thereon for rotary movement about a first axis and pivotal movement about a second axis disposed substantially at right angles and extending through said first axis.

* * * * *